United States Patent [19]
Kinsey

[11] 4,454,844
[45] Jun. 19, 1984

[54] FOUR CYCLE ROTARY ENGINE EMPLOYING ECCENTRICAL MOUNTED ROTOR

[76] Inventor: Lewis R. Kinsey, 108 S. 25th St., Phoenix, Ariz. 85034

[21] Appl. No.: 355,841

[22] Filed: Mar. 8, 1982

Related U.S. Application Data

[63] Continuation of Ser. No. 126,978, Mar. 3, 1980, abandoned.

[51] Int. Cl.³ .............................................. F02B 53/08
[52] U.S. Cl. ................................................. 123/236
[58] Field of Search ............................... 123/204, 236

[56] References Cited

U.S. PATENT DOCUMENTS

| 1,661,593 | 3/1928 | Bodker | 123/236 |
|---|---|---|---|
| 2,114,674 | 4/1938 | Buckbee | 123/236 |
| 2,158,532 | 5/1939 | Bullen | 123/236 |
| 3,103,920 | 9/1963 | Georges . | |
| 3,213,838 | 10/1965 | Douroux . | |
| 3,215,129 | 11/1965 | Johnson . | |
| 3,324,840 | 6/1967 | Linn . | |
| 3,537,432 | 11/1970 | Jordaan . | |
| 3,568,645 | 3/1971 | Grimm . | |
| 3,713,426 | 1/1973 | Jensen . | |
| 3,989,011 | 11/1976 | Takahashi | 123/204 |
| 4,024,840 | 5/1977 | Christy . | |
| 4,154,208 | 5/1979 | Kunieda . | |

FOREIGN PATENT DOCUMENTS

| 16508 | 12/1912 | France | 123/236 |
|---|---|---|---|
| 902396 | 12/1944 | France | 123/236 |
| 2338384 | 8/1977 | France | 123/236 |

Primary Examiner—Michael Koczo
Attorney, Agent, or Firm—Warren F. B. Lindsley

[57] ABSTRACT

A four cycle rotary internal combustion engine employing two cycles of operation per rotation of the rotor and wherein an eccentrically mounted rotor with radial unbiased blades slidable therein form with the external wall of the rotor and the internal wall of the casing surrounding it, a plurality of chambers, the volumes of which vary constantly during rotation of the rotor.

5 Claims, 8 Drawing Figures

FOUR CYCLE ROTARY ENGINE EMPLOYING ECCENTRICAL MOUNTED ROTOR

BACKGROUND OF THE INVENTION

This application is a continuation of U.S. patent application, Ser. No. 126,978, filed Mar. 3, 1980, now abandoned, and entitled FOUR CYCLE ROTARY ENGINE EMPLOYING ECCENTRICAL MOUNTED ROTOR.

This invention relates to an internal combustion engine employing an eccentrically mounted rotor with radial unbiased blades slidable therein so as to form with the external wall of the rotor and the internal wall of the casing surrounding it, a plurality of chambers the volumes of which vary constantly during rotation of the rotor.

More particularly, a very simple four cycle rotary engine is disclosed employing a novel power shaft on which are pressed by hand, if so desired, all of the parts to form a lightweight super charged rotary engine.

DESCRIPTION OF THE PRIOR ART

U.S. Pat. No. 3,103,920 discloses an internal combustion engine having an eccentrically mounted rotor with radial blades slidable therein which employs circular links on the inside ends of the vanes in order to keep these vanes in line with the outer circular combustion chamber.

U.S. Pat. No. 3,213,838 discloses an internal combustion rotary motor of the four cycle type having a power stroke for each half revolution of the rotor. Only two vanes are used 180 degrees apart and are coil spring biased.

U.S. Pat. No. 3,215,129 discloses a rotary internal combustion motor in which a single rotor confined within a housing is divided to provide a combustion unit on one side thereof and a compression unit on the other side thereof and a transfer valve for intermittently admitting fuel air mixture from the compression unit into the combustion unit in timed relation with the operation of the rotor. Rocking guides are used to enclose the vanes in order to keep them in line with the offset circular combustion chamber. A separate gear driven timing mechanism is arranged between the two rotors.

U.S. Pat. No. 3,324,840 discloses an engine and compressor arrangement of the rotary vane type wherein a compressor apparatus is adapted to supply a compressed charge of air-fuel mixture to the engine. Extra connecting links are used on the inside ends of the vanes to keep them in line with the outer circular combustion chamber.

U.S. Pat. No. 3,537,432 discloses a rotary engine having an eccentrically mounted rotor with radial blades slidable therein employing extra connecting links to hold and operate the blades. Each blade or vane is made in two parts and held apart by a coil spring.

U.S. Pat. No. 3,568,645 discloses a rotary combustion engine employing radial positioning of the vanes during the rotation of the engine rotor shaft for positive positioning relative to the outer shell of the engine independent of the contact of the outer end of the vane and the inner surface of the outer shell.

U.S. Pat. No. 3,713,426 discloses a vaned rotor engine and compressor having vanes projecting through slots in a cylindrical rotor mounted off-center on bearings in a casing. The rotor drives through gear means an accessory shaft. The vanes revolve around a shaft that is in the center of the outer circular combustion chamber but they operate through an off-center cylindrical rotor.

U.S. Pat. No. 4,024,840 discloses an engine and compressor arrangement wherein a conduit connects the compression charge outlet of the compressor to the intake part of the engine so that a compressed charge may be fed into the engine. The vanes are controlled by links on the ends of the vanes.

U.S. Pat. No. 4,154,208 discloses a rotary engine having an annular space formed between the housing and the rotor, the annular space being divided into an intake compression chamber and air expansion exhaust chamber.

None of these patents disclose the particular hardware configuration claimed which is believed to be economical to manufacture and more efficient to operate than prior art structures.

SUMMARY OF THE INVENTION

In accordance with the invention claimed, an improved very simple four cycle rotary internal combustion engine employing a novel power shaft is provided which has only two cycles of operation per rotation of the rotor.

Accordingly, it is one object of this invention to provide an improved rotary internal combustion engine employing a novel power shaft on which is mounted two rotors confined within a housing with the rotor being divided to provide an intake and compression compartment and an expansion and exhaust compartment with the fuel injection nozzle, glow plug and firing chamber therebetween, as shown in FIG. 7.

Another object of this invention is to provide an improved rotary internal combustion engine employing a novel power shaft on which are mounted two rotors employing movable vanes which are radially operable in an elliptical working chamber without the use of links and springs.

A further object of this invention is to provide an improved rotary internal combustion engine employing a novel power shaft on which are press fit mounted all of its component parts which may be quickly assembled and disassembled for service or repair purposes.

A still further object of this invention is to provide an improved rotary internal combustion engine employing two rotor portions operating in tandem in two elliptical working chambers or compartments to form two engine sections.

A still further object of this invention is to provide a simple, efficient and practical rotary internal combustion engine.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWINGS

The present invention may be more readily described by reference to the accompanying drawings in which:

FIG. 7 is a cross-sectional view partly in elevation of the rotary internal combustion engine shown in FIG. 1 taken along the line 7—7 of FIG. 4.

DESCRIPTION OF THE PREFERRED EMBODIMENT

Figure 1:
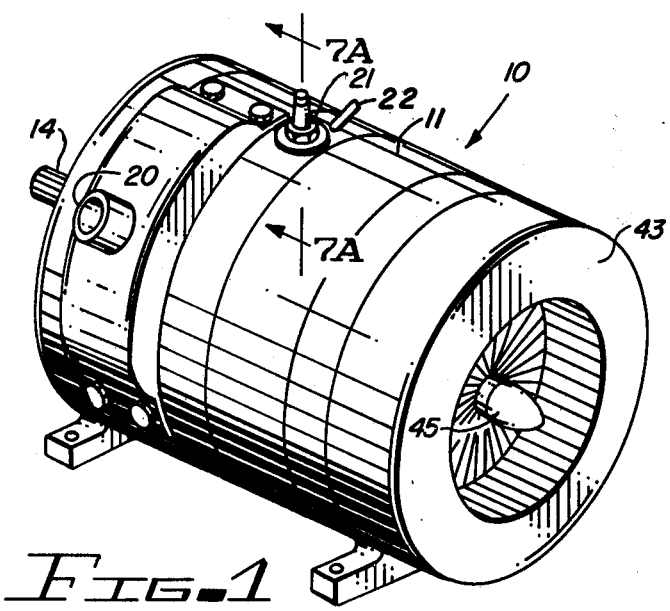
FIG. 1 is a perspective view of the disclosed rotary internal combustion engine embodying the invention.
Figure 7A:
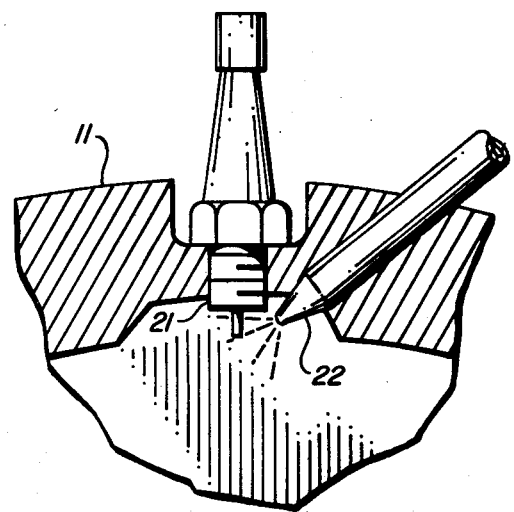
FIG. 7A is a cross-sectional view of FIG. 1 taken along the line 7A—7A.
Figure 2:
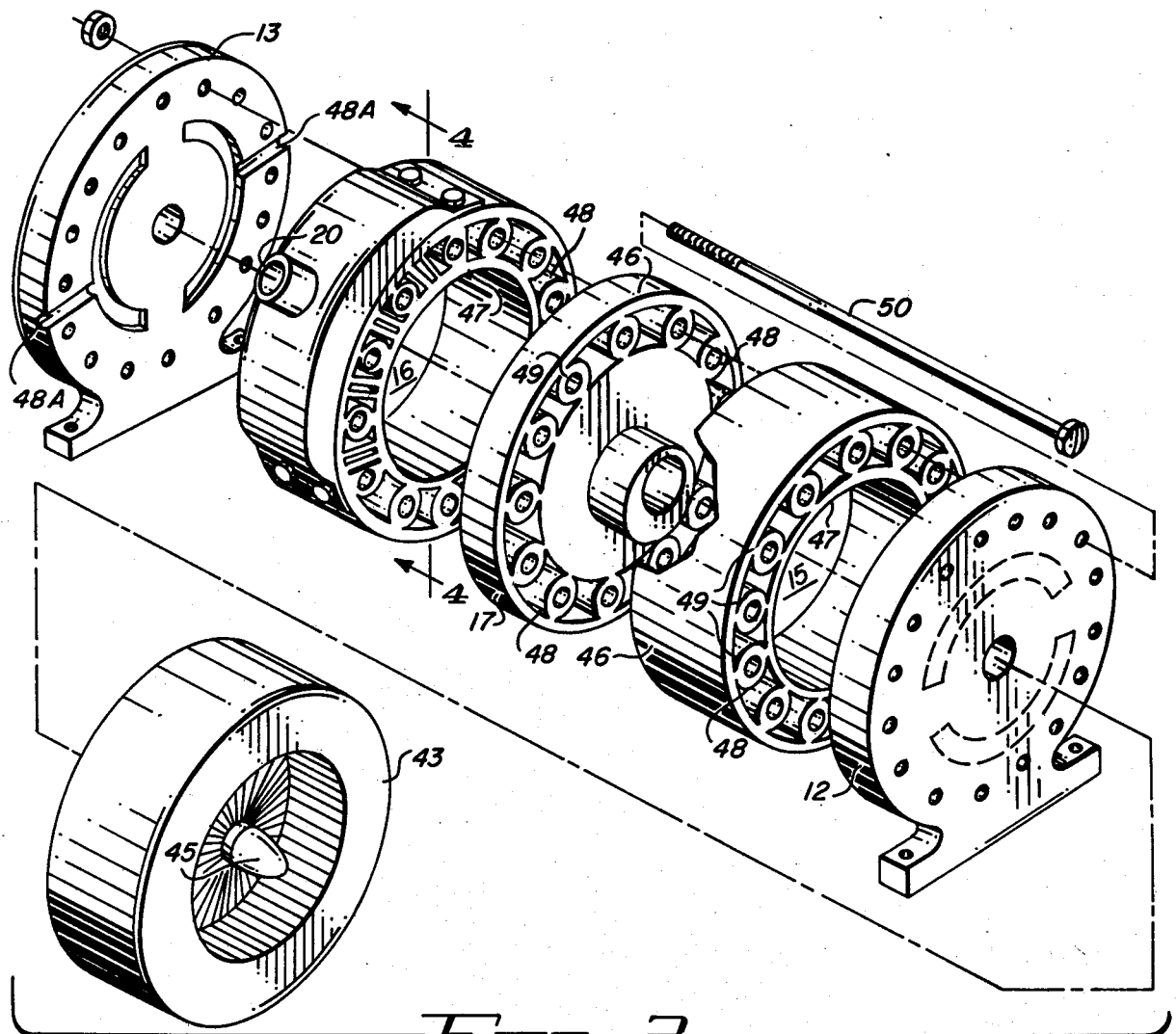
FIG. 2 is an exploded perspective view of the rotary internal combustion engine shown in FIG. 1.

Referring more particularly to the drawings by characters of reference, FIGS. 1–7A disclose a rotary internal combustion apparatus or engine 10 comprising a cylindrical housing 11 having end plates 12 and 13 which hold and rotatably support a shaft 14 therein. The ends of the shaft penetrate each end plate to transmit the rotation of the shaft out of the housing. Between the housing 11 and shaft 14 are provided at least two annular spaces 15 and 16 which are mutually separated by dividing wall or center plate 17. One of the annular spaces, such as space 15, constitutes the intake compression engine chamber for intake and compression and the other space 16 comprises the expansion and exhaust chamber with the center plate 17 separating the two chambers.

Between the two engine spaces or chambers 15 and 16 is a passage 18 extending over center plate 17 which is open and closed by the vanes upon rotation of a rotor mounted on shaft 14 as hereinafter explained. The intake compression engine chamber 15 is equipped with an intake air port 19 and the expansion exhaust chamber 16 is equipped with an exhaust port 20.

Center plate 17 is provided with a glow plug 21 the tip of which extends into passage 18 and a fuel intake port 22 communicating with passage 18 for the injection of a suitable combustion fuel 23.

As noted from the drawings, shaft 14 is mounted within thrust bearings 24 and 25 formed in end plates 12 and 13, respectively, such that it is eccentrically positioned relative to chambers 15 and 16. A rotor structure 26 comprising two rotors 26A and 26B is mounted on shaft 14 such that one rotor lies within each of these chambers as shown. A plurality of radially disposed slots 27 are spacedly arranged around the outer periphery of each of the rotors 26A and 26B of rotor structure 26 and extend therethrough to their hollow interiors for slidingly receiving therein a plurality of vanes 28.

A pair of cylindrical members 29 forming guiding surfaces 30 around their outer peripheries are mounted on center plate 17 eccentrically to shaft 14.

The cylindrical members are arranged one in each of chambers 15 and 16 to function as a cam member for moving vanes 28 in and out of their respective slots 27 in rotor structure 26 as shaft 14 rotates. The length of the vanes 28 in a radial direction of shaft 14 is such that their ends 28A and 28B are always in contact with the inside periphery of housing 11 and the outside periphery of cylindrical member 30. This feature occurs because the longitudinal axis of guiding member 30 is eccentrically arranged with the longitudinal axis of shaft 14. For this reason, no springs or linkage arrangements are necessary to positively control the movement of vanes 28. They are constantly moved upon rotation of shaft 14 in their respective slots 27 in rotors 26A and 26B about the outer periphery of member 30 and the inside periphery of housing 11. The guiding members 30 act as guides or cams for keeping the tips 28A of vanes 28 against the inside periphery of the outside circular combustion chamber walls of housing 11 at all times while working or being controlled by guiding member 30. Power shaft 14 is offset to its housing 11 and the vanes 28 are arranged in perfect alignment with the center of the combustion chamber formed in housing 11 in only two places which are 180 degrees apart. At all other times, the inside ends 28B of vanes 28 are slightly out of line with the center of the combustion chamber and if the guiding member 30 was perfectly round, vanes 28 would be too short to form a tight seal with the inside surface of housing 11 around the combustion chamber.

Vanes 28 move radially outwardly of shaft 14 at substantially a 90 degree angle to the power shaft 14 as they rotate in rotor structure 26. These vanes, although loosely arranged in slots 27, do not shuttle back and forth in relation to the combustion chamber. They rotate in perfect balance and when the motor is running, centrifugal force holds them against the inner walls of housing 11 thus forming a good seal with the walls of the combustion chamber. Actually, the rotor moves radially of the vanes.

As noted from FIG. 7 of the drawing, the arcuate pear shaped guiding members 30 comprising its two parts are fixedly attached one to each of the side surfaces of center plate 17. Each part of member 30 is substantially identical. However, it should be recognized that for timing purposes, one part may be angularly positioned relative to the other so that it may cause its cycle of operation of the associated vanes 28 to function a few degrees ahead of the vanes operating on the other part of the guiding member 30.

Since the working pressure of this apparatus is within the outer periphery of housing 11, the only pressure seals required on the power shaft 14 or elsewhere are those seals 31 mounted adjacent the outer periphery of the rotors 26A and 26B in the end and center plates 12, 13 and 17, respectively. These seals may be metal rings which make contact with the rotors all around the outer periphery and on both sides of the rotor portions 26A and 26B. These rings have installed behind them light, flexible metal expanders (not shown and well known in the art) which will be secured so that the rings or seals will not turn with the associated rotors.

Figure 3:
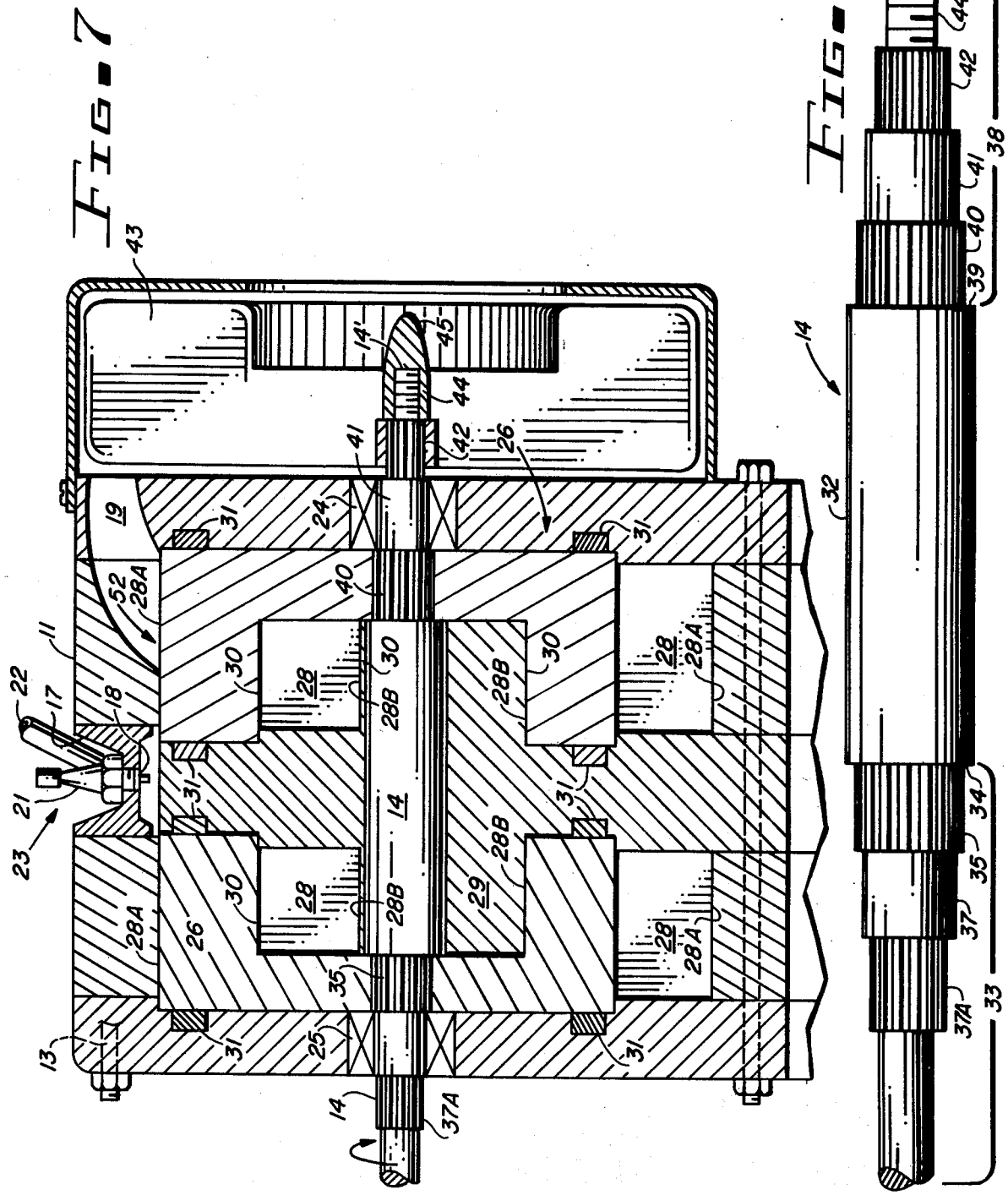
FIG. 3 is a perspective view of the power shaft of the rotary internal combustion engine shown in FIGS. 1 and 2.

As noted from FIGS. 3 and 7, the power shaft 14 is provided with a unique shape for purposes of simplicity. It is machined down to several different sizes on each end after being measured and cut to the proper length. The center section 32 is the largest portion of the shaft and it is provided for rotating within the center plate 17 and guiding member 30. The power end 33 of the shaft is machined down to form a shoulder 34 and a short splined section 35 for engaging matching teeth 36 (shown in FIG. 6) on the inside periphery of the rotor portion 26B. The next portion on the power end 33 of the shaft is machined down to provide a smooth bearing surface 37 for bearing 25. The remaining power input portion 37A of the power end of shaft 14 is machined down further for ease in replacing the bearing and may be provided with splines for a gear for both the starter and accessory drive gear and must be on the outside of engine housing. It should be recognized that any number of shapes may be formed on this power end of the shaft depending on the work function used with it.

The other end 38 of the power shaft 14 is also machined down leaving a shoulder 39 to provide a splined section 40 for engaging teeth 36 of the intake compression rotor portion 26A. A smooth bearing engaging portion 41 is provided next to splined section 40 in the same manner as portion 37 at the power end 33 of shaft 14. A further splined section 42 is provided next to the bearing engaging portion 41 for engaging with the co-operating teeth of an associated blower or fan 43 mounted therearound. The end of this portion of the power shaft is further machined down below the level of the splines in portion 42 to provide a threaded portion 44 for a streamlined lock nut 45 shown in FIGS. 1 and 7.

This power shaft is the support on which the rotary engine is assembled. It is designed and milled down so that all major parts can be easily assembled and removed therefrom for repair. As noted from FIG. 3, the center section is the largest part of the shaft and comprises a given diameter with each end being measured off and milled down four times and splined two times for the correct and easy reception of their respective parts.

All parts assembled on the power shaft may be pressed on by hand including the rotor and thrust bearings. When the parts are assembled, the long bolts shown in FIG. 7 hold all of the parts together forming a simple, lightweight engine that may be easily disassembled for repair and servicing functions.

It should be noted that the two rotors 26A and 26B provide a complete four cycle rotary engine. However, if a centrifugal blower or fan 43 is added to the power shaft 14 in the position shown and blowing into the intake compression portion of the apparatus, this fan acts as a simple but very effective super charger that would give a substantial boost in power with a small increase in weight of the apparatus. This super charger feature and increased manifold pressure can more easily be applied to a rotary engine than to a piston type engine without harmful effects.

As noted from the drawing, the engine or apparatus disclosed has no mechanical valves and needs none. It is provided with intake and exhaust ports 19 and 20 which may be placed in any chosen position for maximum power and economy purposes.

The oiling or lubricating system for engine 10 is simple since only the two main bearings 24 and 25 need attention with further lubrication being applied to the ends 28A and 28B of the vanes 28 where they scrape or rub on the inside periphery of housing 11 and on the outside periphery of their guiding means 30. None of these oiling requirements need oil under high pressure and consequently can be fed into the combustion chamber formed in housing 11 with a variable displacement pump at a rate depending on engine speed, load, etc. in the same manner as the late model two cycle gas engines.

The cooling system for the disclosed engine may comprise either an air cooled or water cooled arrangement.

Housing 11 comprises a double wall structure having an outer cylindrical wall 46 and an inner cylindrical wall 47 enclosing a hollow space 48 extending longitudinally of and through the rotors 26A and 26B and center plate 17. A plurality of guiding tubes 49 are spacedly arranged around the periphery of the rotors 26A and 26B and center plate 17 within the hollow space 48 and longitudinally thereof for receiving elongated bolts 50.

These bolts extend between the end plates 12 and 13 to hold the parts of the engine together as shown. Water or air is circulated through this cooling chamber formed by the hollow space 48 in the usual known manner and exits from the housing through ports 48A in end plate 13.

The enclosure around blower or fan 43 need not be cooled because it handles only cool fresh air and is merely bolted onto the rotary housing 11 which is water or air cooled. Suitable hose connections (not shown) may be secured one to each end plate of the engine with water flowing only one way or each connection may be mounted on the same end of the engine with the cooling fluid making a complete round trip through both the combustion chambers 15 and 16 first up one side of the engine and back the other side.

If the engine is air cooled, it could employ only the outer wall 46 with a plurality of cooling fins (not shown) running along the outer periphery of wall 46 lengthwise of the power shaft 14.

It should be noted that fan 43 may be enlarged so that it can act as the air cooling means for the engine in addition to the super charger feature heretofore explained. If used for the dual purpose disclosed, the center section of the fan blades can be made of one type of fan blade surrounded by a metal band for its super charger function and the outer section can have a different type of blade configuration for functioning as an engine cooling means with both fan blade portions interconnected for long and trouble free life.

As in the usual rotary internal combustion engine, the initial movement of the drive shaft 14 is imparted thereto by any suitable means such as an electric starting motor of the type commonly utilized with internal combustion engines. The initial rotational displacement of the rotor means 26 will cause vanes 28 operatively associated therewith to induce a uni-directional flow of the fuel and air mixture components introduced into passage 18 from fuel intake port 22 and air intake port 19 through the annular spaces 15 and 16 of the engine. It is seen that this fuel and air mixture will be substantially continuous as long as the engine is operating. As the air enters the compression section 15 of the working portion of the engine, it will be compressed due to the tapering nature of the space, chamber or area 51 located between the rotor 26A (shown in FIG. 4) and the inner wall 48 of housing 11. The air is compressed between rotor 26A, inner wall 48 of housing 11 and the operatively associated vanes 28. The compression may reach a suitable compression at approximately 150 degrees of rotation from slot 52 introducing the air into the engine from the air input port 19.

In operation, this blower fan blade in front forces all the air under a positive pressure to the intake compression rotor chamber 15 giving it a super charged effect and giving more power to the engine. The air is further compressed here as it makes another partial revolution and as it enters into the expansion and exhaust chamber 16, a fuel is continuously injected into this air stream by an injection nozzle 22 to form the proper fuel mixture. The vanes 28 carry this mixture past the glow plug where it is ignited and it starts to expand, but immediately it is passed into the expansion exhaust chamber 16 where it does the work. The combustion of the fuel air mixture causes a rapid increase in pressure contained within this portion of space 16 as well as an increase in temperature of housing 11. The gases expand into the increasing tapering space 53 of engine 10. As a result of this increase in pressure and temperature, all in accordance with well known scientific principles, vanes 28 will be displaced in the direction of the arrow in FIG. 4.

Figure 4:
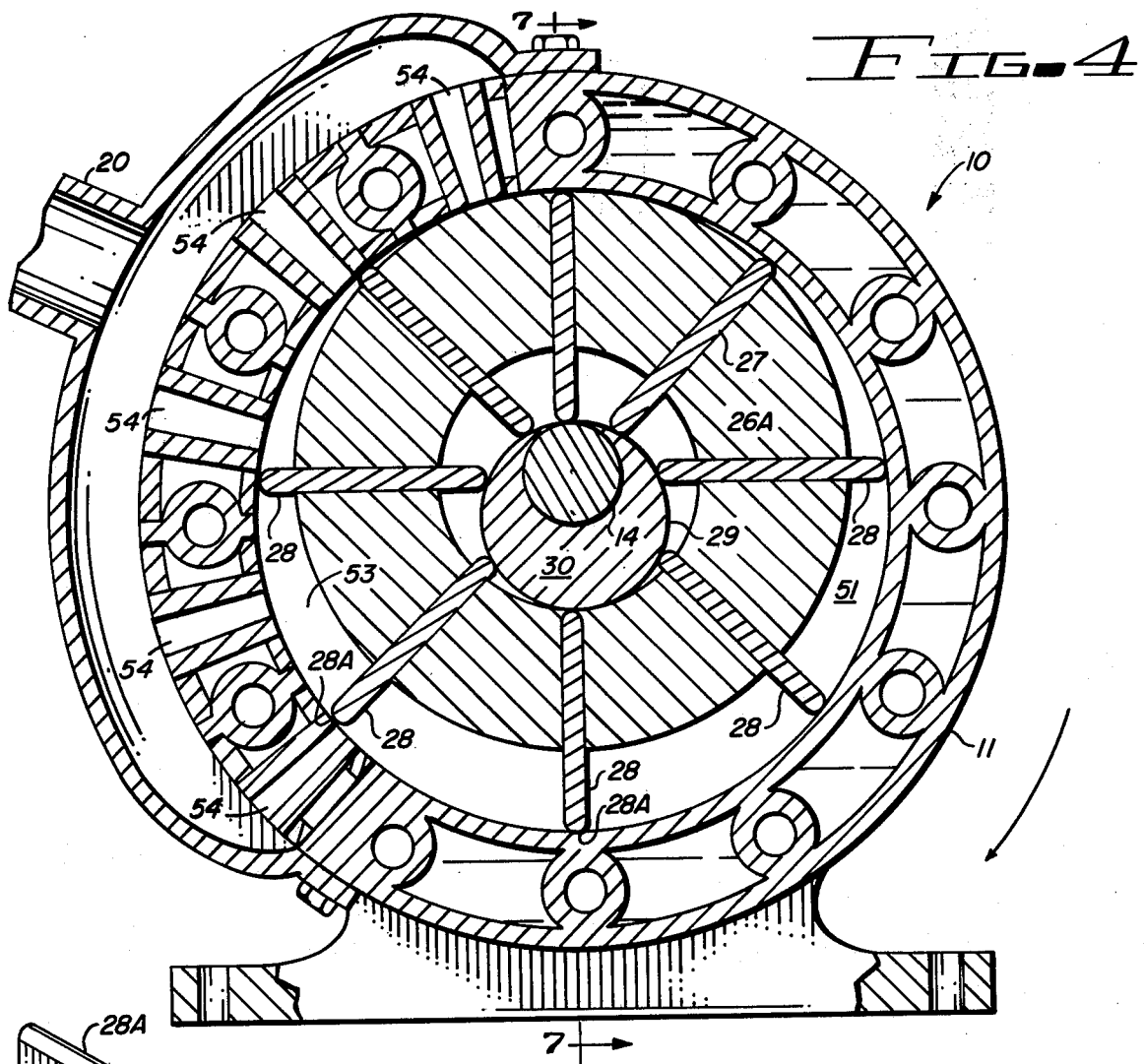
FIG. 4 is a cross-sectional end view of the rotary internal combustion engine shown in FIGS. 1 and 2.
Figures 5, 6:
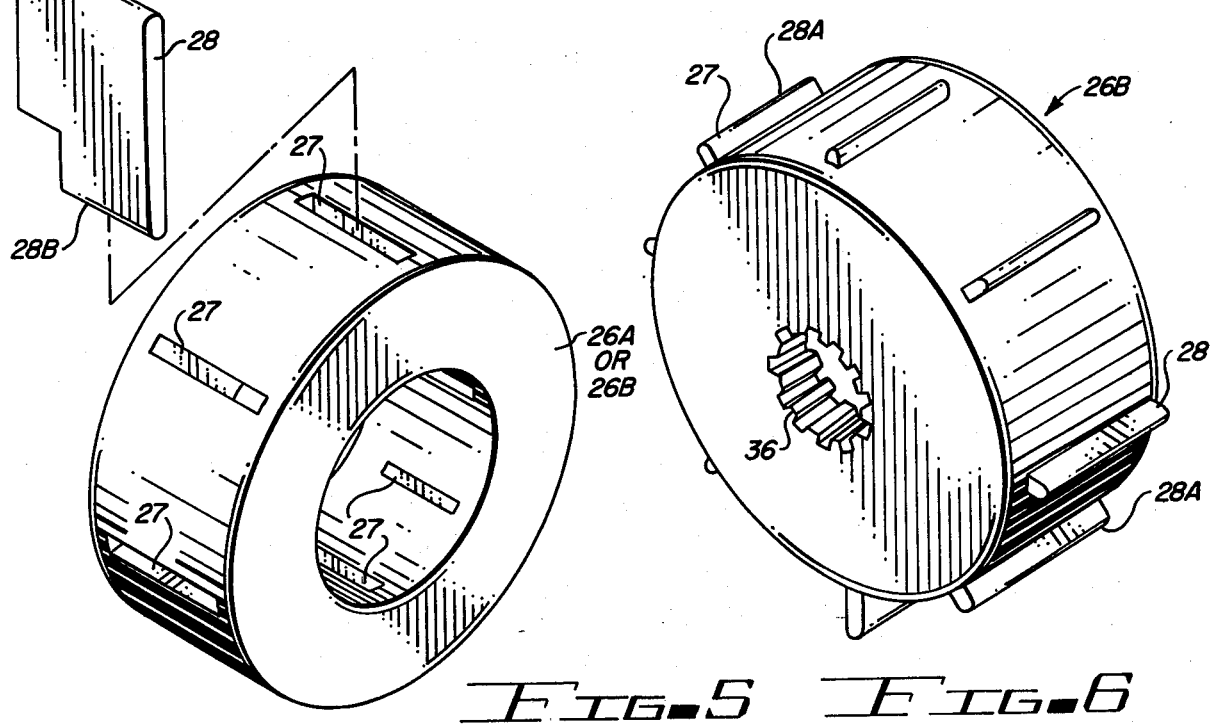
FIG. 5 is an exploded perspective view of one end of the rotor showing a vane and a plurality of vane slots.
FIG. 6 is a perspective view similar to FIG. 5 of the other end of the rotor and showing the vanes in position in the vane slots.

The pressure of the combused fuel and air mixture causes vanes 28 and the associated rotors 26A and 26B to move in a clockwise or counterclockwise direction depending on the engine design configuration until the combusted fuel air mixture reaches the spacedly arranged discharged slots or ports 54 formed to extend through the walls 46 and 47 of housing 11 as shown in FIG. 4 where the residue of the combusted fuel and air mixture is scavenged from the tapering space or channel 53.

In summation, the present invention comprises a rotary engine built upon a novel power shaft for any air or land vehicle use wherein a means for the continuous igniting of an air fuel mixture is employed. A dual compression section and combustion section is employed with one power shaft using two separate rotors or rotor portions. Thus, an efficient, simple engine mounted upon a novel power shaft is provided with ample cooling and super charger features employed which may be easily assembled and disassembled for repair services.

The engine described incorporates only a few moving assemblies comprising the rotors 26A and 26B so that wear and mechanical energy losses are held to a minimum. The relatively simple mechanical construction also lends itself to the realization of a low manufacturing cost.

The rotor in the expansion exhaust zone which is exposed to high temperature can be made out of any suitable material that has been developed for internal combustion engines which will give it a greater heat range and more power.

Although but a single embodiment of the invention has been illustrated and described, it will be apparent to those skilled in the art that various changes and modifications may be made therein without departing from the spirit of the invention or from the scope of the appended claims.

What is claimed is:

1. A rotary engine comprising:
   a housing having a rotary chamber,
   said chamber comprising two compartments defining an intake compression zone and an expansion exhaust zone,
   an elongated shaft journaled within said housing offset from the center line of said housing,
   said shaft comprising a center section of a predetermined diameter and two end sections,
   each end section comprising a plurality of portions with the diameter of each portion progressively decreasing in diameter from said center section toward each end of said shaft,
   each end section comprising a splined portion immediately adjacent the end of said center section, a smooth bearing portion positioned outwardly of said splined portion and an end portion, said bearing portion forming a journal for said housing,
   said two compartments of said chamber being separated by a center plate forming a part of said housing and extending substantially perpendicular to said shaft at substantially the center thereof,
   two rotors, one slidably attached from a different end of said shaft, one to each splined portion for rotation therewith, the axis of said rotors being eccentrically positioned relative to the axis of said chamber, and said rotors being positioned one in each of said compartments,
   pressure seals mounted within said housing in each of said two compartments and on each side of said center plate for engaging each side of each of said two rotors for maintaining pressure within said two compartments,
   each of said rotors having a plurality of radial openings therein,
   vane means disposed in each of said radial openings for relative sliding movement therewith and rotary movement along with said rotors,
   a cam mounted in each of said compartments and having a surface for guiding the movement of said vane means upon rotation of said rotors,
   said cam comprising a pear shaped configuration being mounted on said center plate through which said shaft extends in a close rotary arrangement with like surfaces in each of said compartments of said chamber,
   air and fuel intake port means and an exhaust port, both mounted in said housing, said intake port means communicating with said intake compression zone and said exhaust port communicating with said expansion-exhaust zone,
   the peripheral surface of said chamber and the outer periphery of said rotors defining between them a circumferential channel extending from said intake port to said exhaust port,
   said exhaust port comprising a plurality of discharge slots spacedly positioned around said chamber adjacent said expansion-exhaust zone,
   said channel in operation of said apparatus forming with said rotors and said vane means a plurality of rotating chambers moving from said intake-compression zone to said expansion-exhaust zone,
   said center plate at a point along its outer periphery forming a transfer channel over said plate and interconnecting said intake-compression zone and said expansion-exhaust zone,
   an ignition means disposed in said transfer channel to ignite a fuel air mixture supplied through said intake port means,
   said vane means comprising a plurality of blades each having a length extending at all times substantially between the periphery surfaces of said chamber and the outer periphery of said cam, and
   a fuel input nozzle connected to a port mounted on the periphery of said center plate adjacent said transfer channel and communicating with said channel for injecting fuel in said channel adjacent said ignition means.

2. The rotary engine set forth in claim 1 in further combination with:
   a fan connected to one end of said shaft for rotation therewith for directing air under pressure into said air and fuel intake port means.

3. The rotary engine set forth in claim 1 wherein:
   the splined portion of each end section is of substantially equal diameter.

4. The rotary engine set forth in claim 1 wherein:
   the bearing portion of each end section is of substantially the same diameter.

5. The rotary engine set forth in claim 1 wherein:
   one end of said shaft is provided with a second splined portion immediately adjacent said bearing portion for power take off and being smaller in diameter than said bearing portion, and
   the other end of said shaft being provided with a fan for rotation therewith for directing air under pressure into said air and fuel intake port means.

* * * * *